(12) United States Patent
Nakayama et al.

(10) Patent No.: US 7,696,432 B2
(45) Date of Patent: Apr. 13, 2010

(54) MOUNTING STRUCTURE OF ELECTRICAL JUNCTION BOX

(75) Inventors: Makoto Nakayama, Shizuoka-ken (JP);
Katsuya Hashimoto, Shizuoka-ken (JP);
Hirofumi Mizuno, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 299 days.

(21) Appl. No.: 11/846,723

(22) Filed: Aug. 29, 2007

(65) Prior Publication Data
US 2008/0239692 A1    Oct. 2, 2008

(30) Foreign Application Priority Data
Aug. 31, 2006    (JP) ............................ P2006-236500

(51) Int. Cl.
*H02G 3/14* (2006.01)
(52) U.S. Cl. ............................. 174/50; 174/53; 174/58; 174/60; 174/480; 174/520; 439/535; 361/600
(58) Field of Classification Search ................... 174/50, 174/53, 57, 58, 60, 480, 481, 135, 520; 220/3.6, 220/3.8, 4.02; 439/76.1, 76.2, 465, 470, 439/535, 217, 218, 747, 903, 949; 361/600, 361/800, 818, 601, 724, 649
See application file for complete search history.

(56) References Cited

U.S. PATENT DOCUMENTS

| 5,159,156 | A | * | 10/1992 | Munk et al. ................... 174/50 |
| 5,227,581 | A | * | 7/1993 | Riviere et al. ................ 174/372 |
| 5,573,317 | A | * | 11/1996 | Cavanaugh et al. ........... 312/7.2 |
| 5,783,774 | A | * | 7/1998 | Bowman et al. ............. 174/482 |
| 6,121,548 | A | * | 9/2000 | Matsuoka ..................... 174/59 |
| 6,126,458 | A | * | 10/2000 | Gregory et al. ............. 439/76.2 |
| 6,858,802 | B2 | * | 2/2005 | Hagarty et al. ................. 174/58 |
| 7,038,132 | B1 | * | 5/2006 | Lowe et al. .................... 174/58 |
| 7,321,096 | B1 | * | 1/2008 | Huang et al. ................... 174/58 |
| 7,422,443 | B2 | * | 9/2008 | Kaneko et al. ............. 439/76.2 |

* cited by examiner

*Primary Examiner*—Dhiru R Patel
(74) *Attorney, Agent, or Firm*—Finnegan, Henderson, Farabow, Garrett & Dunner, L.L.P.

(57) ABSTRACT

In a mounting structure of an electrical junction box, the electrical junction box is vertically mounted on a wall surface along a vertical direction in a state where mating faces of an under case member and an upper case member are set in the vertical direction. Each of the under case member and the upper case member has a pair of left and right locking projections provided therein. A bracket including a backside plate part and a pair of case hook parts provided upright from both sides of the backside plate part is disposed along the vertical direction on the wall surface. The electrical junction box is slidingly inserted from above along the backside plate part in the vertical direction until both pairs of locking projections of the under case member and the upper case member are locked to the pair of case hook parts. Thus, the electrical junction box is mounted on the wall surface by use of the bracket.

4 Claims, 8 Drawing Sheets

MOUNTING STRUCTURE OF ELECTRICAL JUNCTION BOX

BACKGROUND OF THE INVENTION

1. Field of the Invention

The present invention relates to a mounting structure of an electrical junction box, in which the electrical junction box is vertically mounted on a wall surface in a state where mating faces of an under case member and an upper case member are set in a vertical direction.

2. Description of the Related Art

Among electrical junction boxes installed in vehicle bodies, there is one vertically mounted on a vehicle body in a state where mating faces of an upper case member and an under case member are set in a vertical direction in consideration of its installation space. A mounting structure of the related electrical junction box is disclosed in Japanese Patent Application Laid-Open Publication No. 2004-140956, which is shown in FIG. 1.

As shown in FIG. 1, an electrical junction box 100 includes an electrical junction box main body 101 and a housing case 102 which houses the electrical junction box main body 101 therein. The housing case 102 consists of an under case member 103 and an upper case member 104. In the electrical junction box main body 101 and the under case member 103, pairs of left and right L-shaped locking pieces 101a and 103a are provided, respectively, at the same positions so as to face opposite directions. On insides of left and right side walls of the upper case member 104, a pair of left and right slide locking parts 104a and 104a are provided, which are locked to the both locking pieces 101a and 103a. At an upper end of the under case member 103, a bolt attachment part 103b is protrudingly provided. At an upper end of the upper case member 104, a cover part 104b is protrudingly provided, which covers the bolt attachment part 103b.

In the above configuration, an assembled body of the electrical junction box main body 101 and the under case member 103 is inserted into a mounting space inside a vehicle body up to a mounting position and is fixed with a bolt to a mounting panel on the vehicle body side by using the bolt attachment part 103b of the under case member 103. Next, the upper case member 104 is slidingly inserted from above with respect to the assembled body of the electrical junction box main body 101 and the under case member 103 while locking the pair of slide locking parts 104a and 104a of the upper case member 104 to the respective locking pieces 101a and 103a of the electrical junction box main body 101 and the under case member 103. Thus, the upper case member 104 is attached to the under case member 103 to complete mounting.

As a matter of course, the mounting structure of the electrical junction box is required to have the electrical junction box mounted so as not to drop downward and the like due to vibration and the like. Moreover, in the vertically mounted electrical junction box, mating faces of the both case members are positioned on an upper surface thereof and a weight of the upper case member does not act on the under case member unlike a horizontally mounted one. Thus, the mating faces of the under case member and the upper case member are easily loosened in an opening direction by vibration and the like. The loosening of the mating faces allows intrusion of water. Accordingly, the mounting structure is required to prevent loosening of the mating faces of the under case member and the upper case member in the opening direction.

In the electrical junction box 100 disclosed in Japanese Patent Application Laid-Open Publication No. 2004-140956, the pairs of left and right locking pieces 101a and 103a of the electrical junction box main body 101 and the under case member 103 are locked to the pair of left and right slide locking parts 104a of the upper case member 104. Thus, the mating faces between the both case members 103 and 104 are never loosened in the opening direction. As a result, a structure having an excellent waterproof property is achieved.

Moreover, Japanese Patent Application Laid-Open Publication No. Hei 10 (1998)-243520 and Unexamined Utility Model Application Publication No. Sho 64 (1988)-54716 disclose a structure in which an electrical junction box is mounted on a vehicle body by use of a locking structure with a bracket and by bolting.

However, in the mounting structure of the related electrical junction box 100 disclosed in Japanese Patent Application Laid-Open Publication No. 2004-140956, a bolting operation is required for the assembled body of the electrical junction box main body 101 and the under case member 103 set in the mounting position. As described above, the installation space of the electrical junction box 100 is small in many cases. Thus, there is a problem of poor mounting workability.

Moreover, also in the mounting structure of the electrical junction box disclosed in Japanese Patent Application Laid-Open Publication No. Hei 10 (1998)-243520 and Unexamined Utility Model Application Publication No. Sho 64 (1988)-54716, a bolting operation is required for case members and the like set in a mounting position. Thus, there is the same problem as that described above.

SUMMARY OF THE INVENTION

The present invention was made to solve the foregoing problems of the related art. It is an object of the present invention to provide a mounting structure of an electrical junction box, which can prevent dropping of the electrical junction box downward and the like and detachment between an under case member and an upper case member and can also achieve good mounting workability.

An aspect of the present invention is a mounting structure of an electrical junction box, comprising: an electrical junction box including a housing case and an electrical junction box main body housed in the housing case, wherein the housing case has an under case member and an upper case member, each of the under case member and the upper case member has a pair of left and right locking projections, and the electrical junction box is vertically mounted on a wall surface along a vertical direction in a state where mating faces of the under case member and the upper case member are set in the vertical direction; and a bracket fixed to the wall surface and having a backside plate part disposed along the vertical direction and a pair of case hook parts provided upright from both side edges of the backside plate part, wherein the electrical junction box is slidingly inserted from above between the pair of case hook parts along the backside plate part in the vertical direction until both of the pairs of the locking projections of the under case member and the upper case member are locked to the pair of case hook parts, and thus is mounted on the wall surface by use of the bracket.

According to the aspect of the present invention, the electrical junction box is slidingly inserted from above along the backside plate part of the bracket until the pairs of left and right locking projections of the under case member and the upper case member are locked to the pair of left and right case hook parts of the bracket, respectively. Thus, mounting of the electrical junction box is completed. Therefore, since a mounting operation such as a bolting operation at a mounting position is not required, good mounting workability is achieved. Moreover, since the respective pairs of locking projections of the under case member and the upper case member are locked to the pair of case hook parts of the bracket, the electrical junction box never drops downward and the like. Furthermore, the backside plate part of the bracket restricts backward movement of the under case member, and the pair of case hook parts of the bracket restrict forward movement of the upper case member. Accordingly, both of the under case member and the upper case member cannot be moved in a direction in which the mating faces thereof are separated from each other. Thus, the under case member and the upper case member are never detached from each other by vibration and the like. Consequently, dropping of the electrical junction box downward and the like and detachment between the under case member and the upper case member can be prevented. Moreover, good mounting workability for the electrical junction box is achieved.

Here, each of the case hook parts may have a lower restricting wall part and a front restricting wall part, and each of the case hook parts may have a locking groove which is surrounded by the lower and front restricting wall parts and has an opening in an upper side thereof.

According to the configuration described above, the same effects as those of the first aspect can be obtained.

Here, each of the case hook parts may have an installation guide plane which guides each of the locking projections of the upper case member into the locking groove.

According to the configuration described above, in addition to the above effects, when the electrical junction box is slidingly attached to the bracket, the pair of locking projections of the upper case member are smoothly inserted into the locking grooves of the pair of case hook parts in the bracket. Thus, workability for the sliding attachment of the electrical junction box to the bracket and thus the mounting workability for the electrical junction box is improved.

Here, each of the locking projections of the upper case member may have a lateral restricting wall which restricts lateral movement of the case hook parts.

According to the configuration described above, in addition to the above effects, it is possible to surely prevent a situation where the pair of locking projections of the upper case member are detached from the pair of case hook parts of the bracket by vibration and the like.

DESCRIPTION OF THE PREFERRED EMBODIMENT

Figure 1:
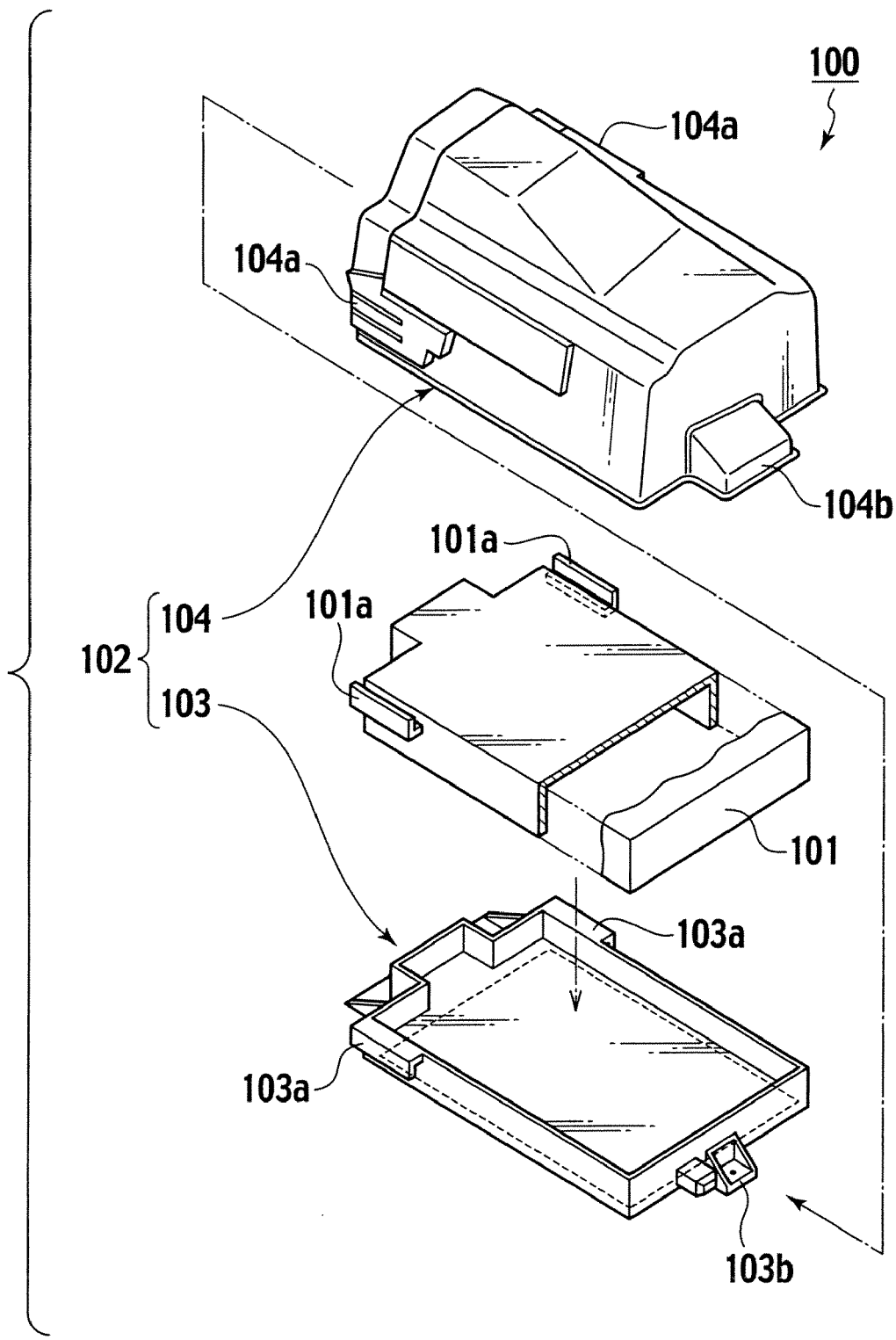
FIG. 1 is an exploded perspective view of a related electrical junction box.
Figure 2:
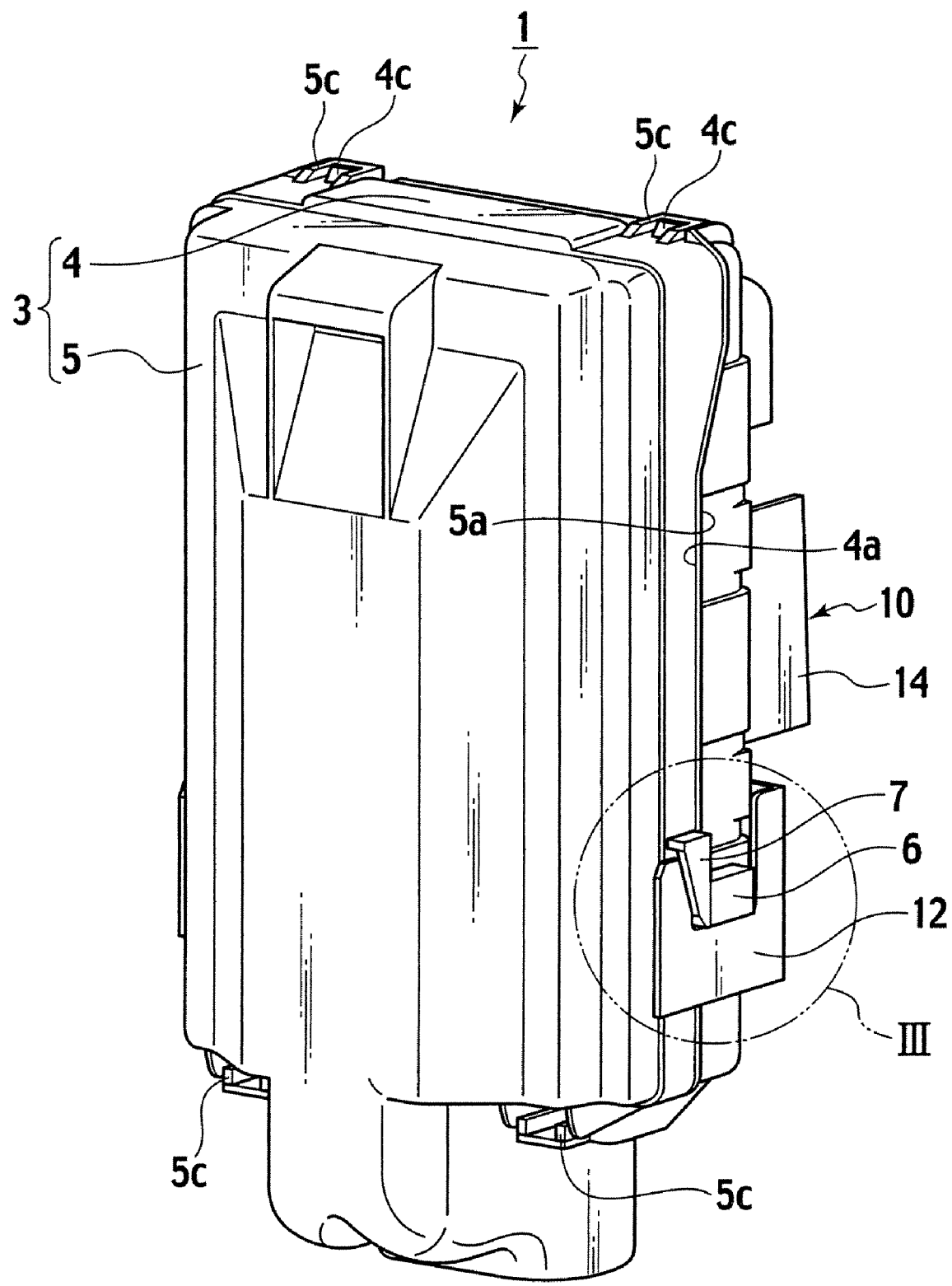
FIG. 2 is a perspective view showing a mounted state of an electrical junction box according to an embodiment of the present invention.
Figure 3:
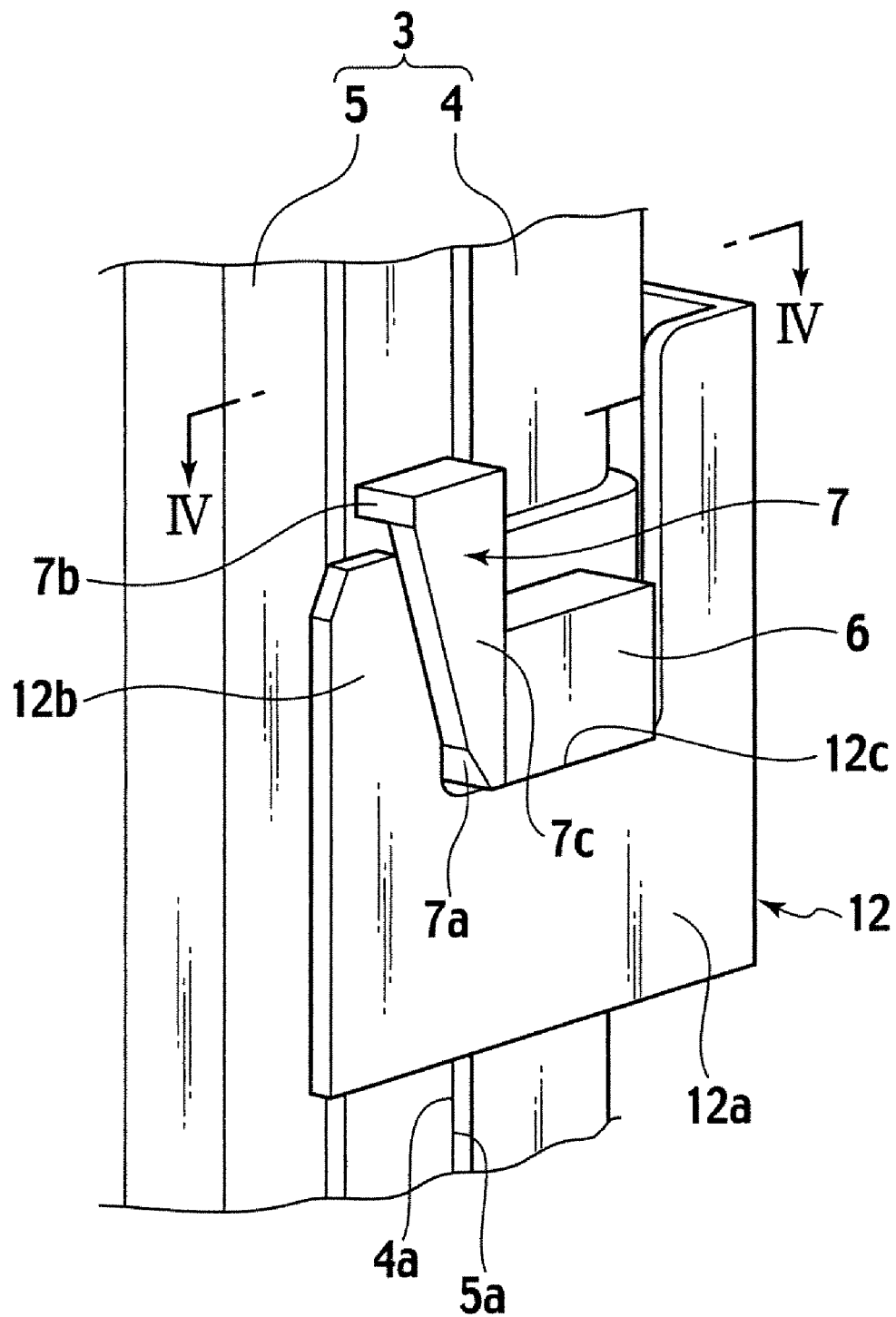
FIG. 3 is an enlarged view of a part III in FIG. 2.
Figure 4:
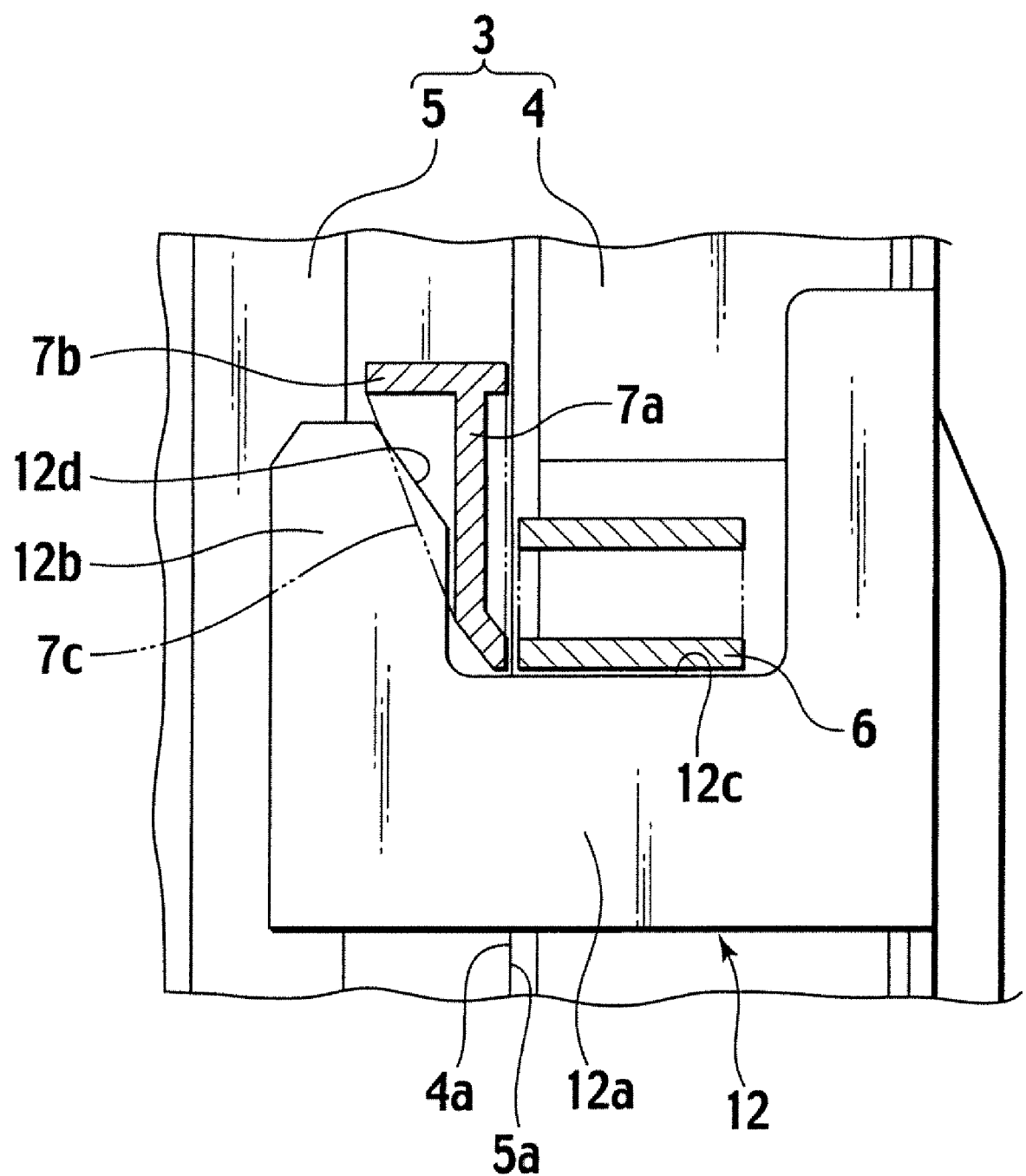
FIG. 4 is a cross-sectional view along the line IV-IV in FIG. 3.
Figure 5:
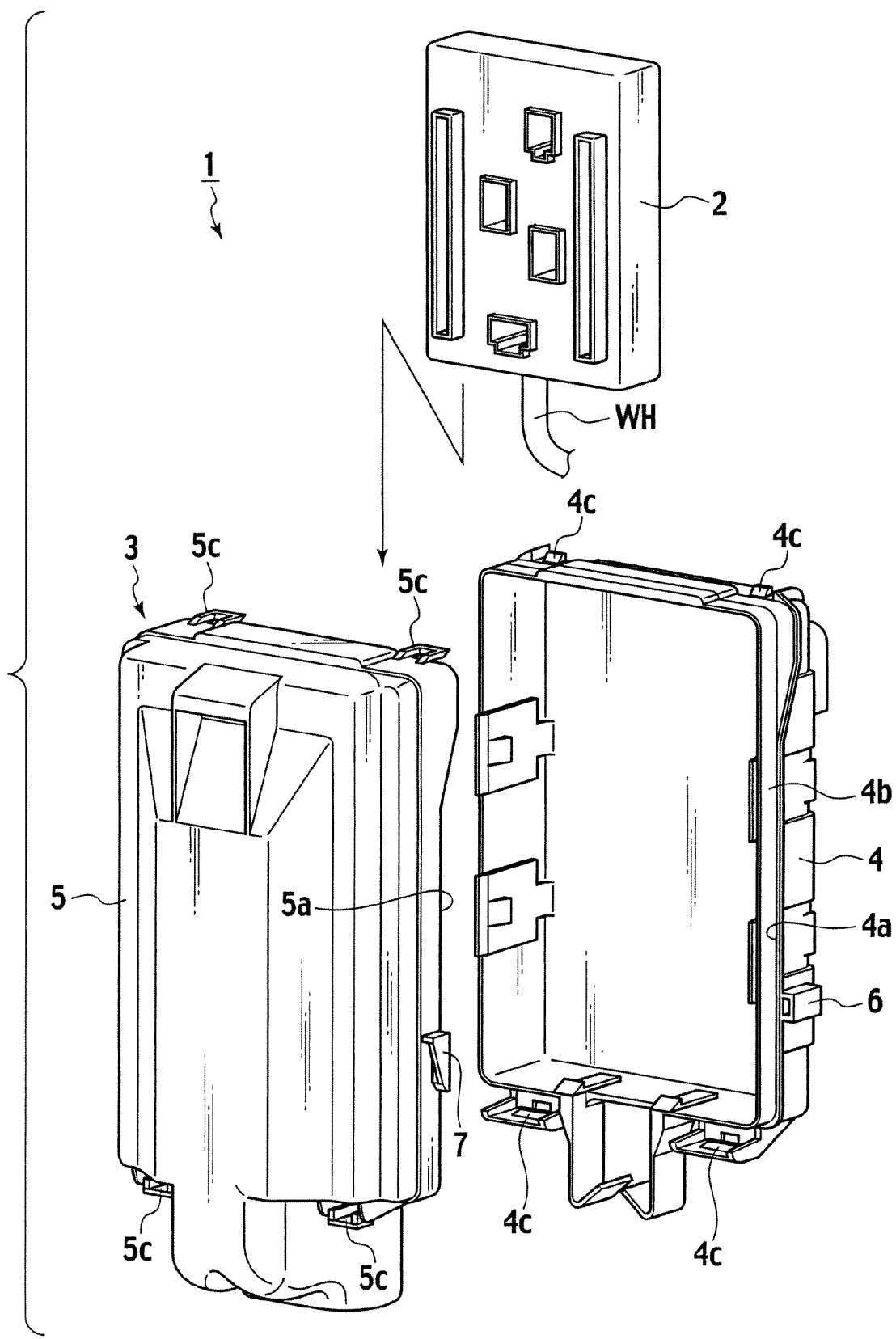
FIG. 5 is an exploded perspective view of the electrical junction box according to the embodiment of the present invention.
Figure 6:
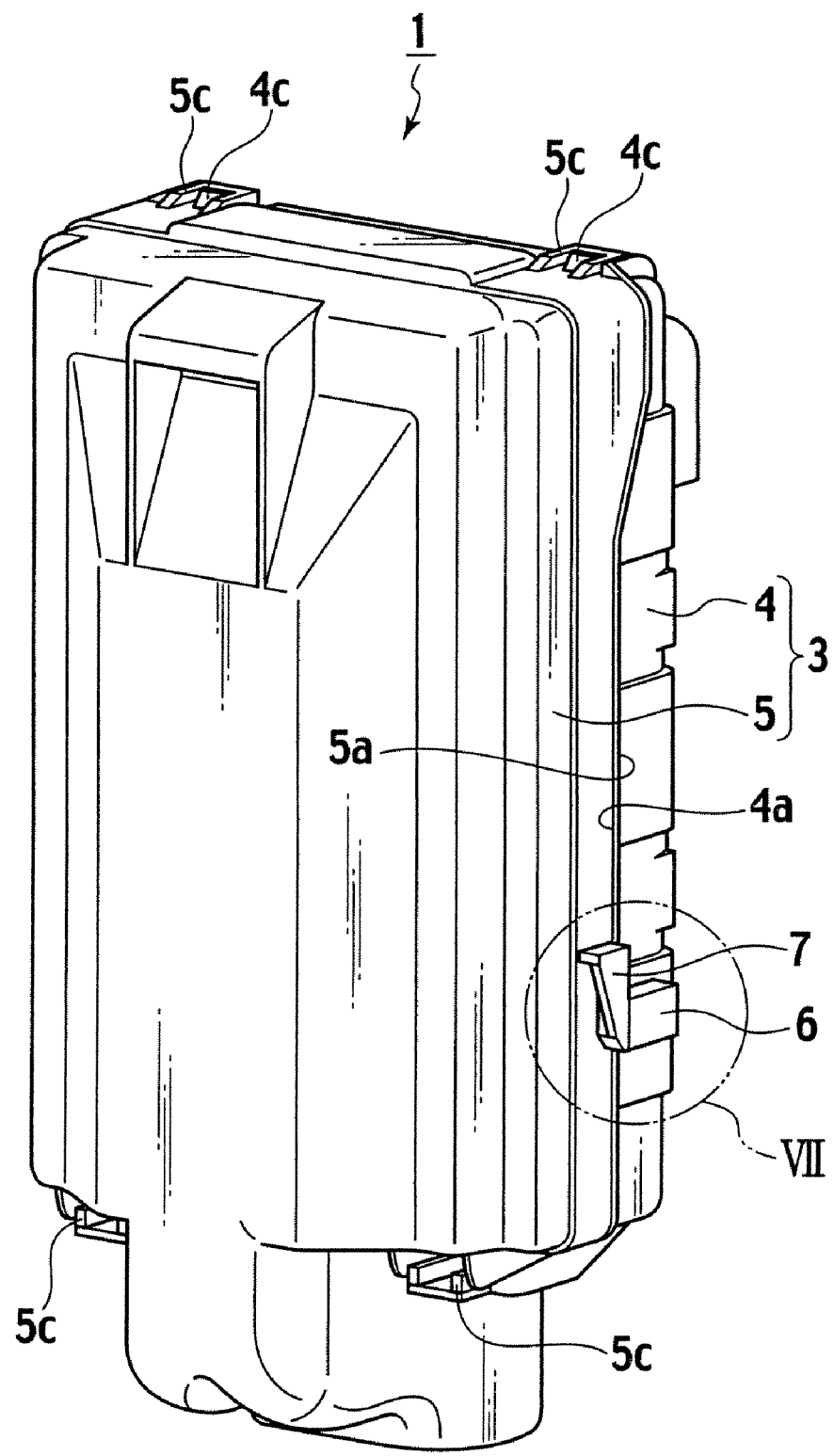
FIG. 6 is a perspective view showing an assembly completed state of the electrical junction box according to the embodiment of the present invention.
Figure 7:
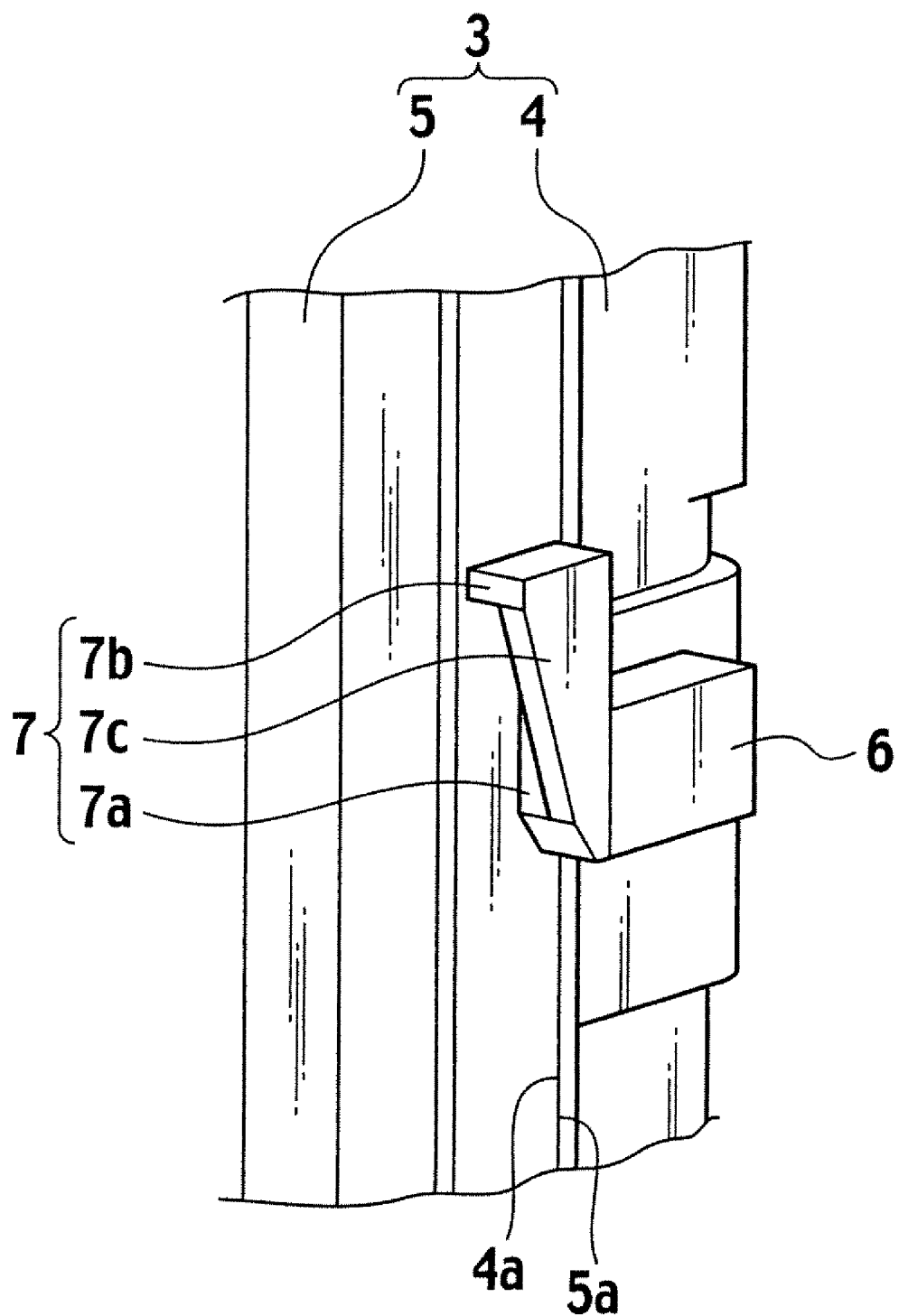
FIG. 7 is an enlarged view of a part VII in FIG. 6.
Figure 8:
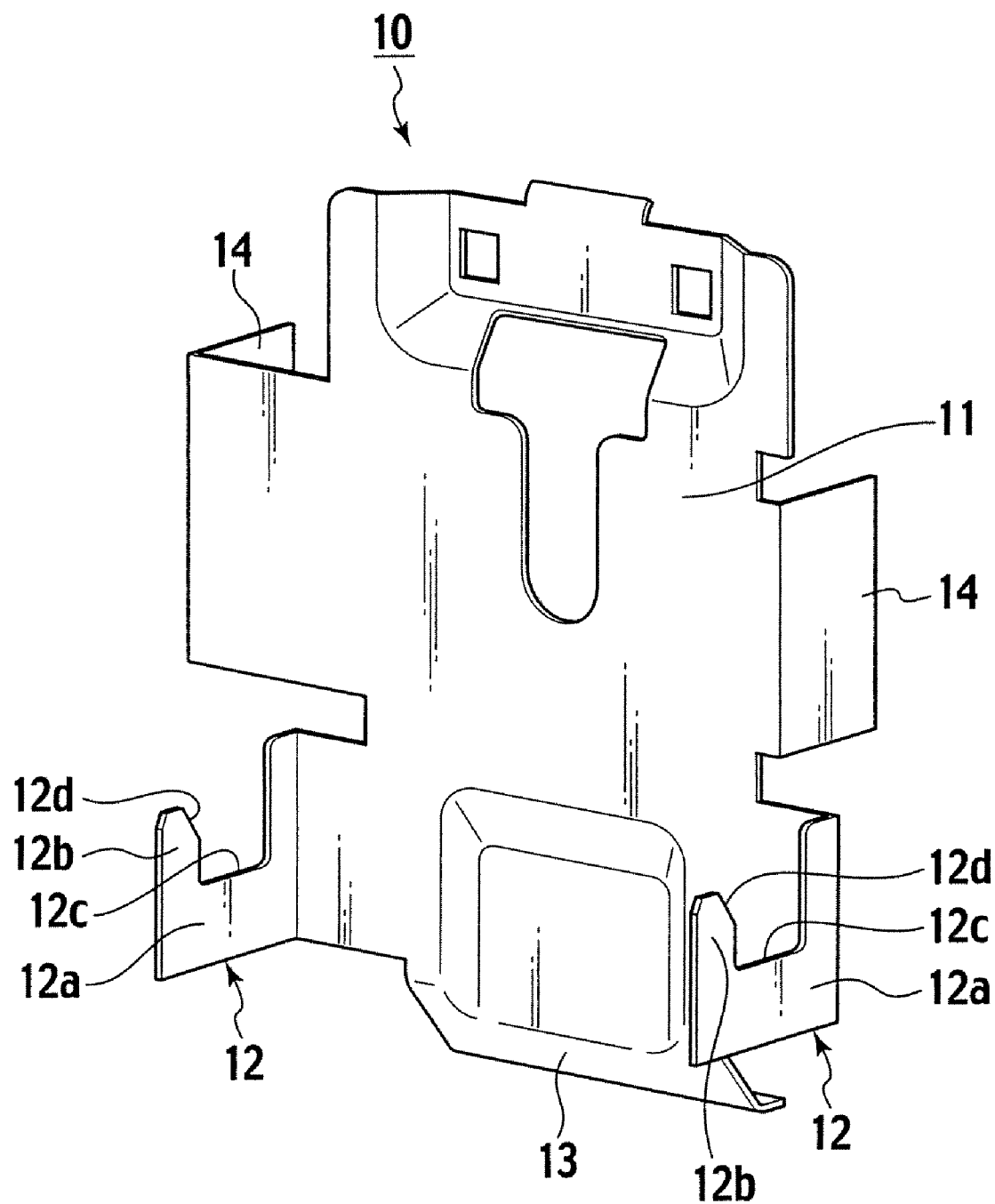
FIG. 8 is a perspective view of a bracket according to the embodiment of the present invention.

With reference to the drawings, an embodiment of the present invention will be described below. In the following description of the drawings, the same or similar parts will be denoted by the same or similar reference numerals. FIGS. 2 to 8 show one embodiment of the present invention. FIG. 2 is a perspective view showing a mounted state of an electrical junction box. FIG. 3 is an enlarged view of a part III in FIG. 2. FIG. 4 is a cross-sectional view along the line IV-IV in FIG. 3. FIG. 5 is an exploded perspective view of the electrical junction box. FIG. 6 is a perspective view showing an assembly completed state of the electrical junction box. FIG. 7 is an enlarged view of a part VII in FIG. 6. FIG. 8 is a perspective view of a bracket.

As shown in FIGS. 2 to 4, by use of a bracket 10 fixed on a wall surface side along a vertical direction of a vehicle body, an electrical junction box 1 is vertically installed in the vehicle body, in other words, is mounted in a state where mating faces 4a and 5a of an under case member 4 and an upper case member 5 are set in the vertical direction.

As shown in FIG. 5, the electrical junction box 1 includes an electrical junction box main body 2 and a housing case 3 which houses the electrical junction box main body 2 therein and consists of the under case member 4 and the upper case member 5.

The electrical junction box main body 2 has fuses, relays and the like mounted therein and houses therein a branch circuit and the like connected through a bus bar. The electrical junction box main body 2 has unillustrated locking parts provided at proper positions on its peripheral surface so as to be housed in a positioned state in the housing case 3. A wire harness WH is extended from the electrical junction box main body 2 and is drawn out to the outside of the housing case 3.

The under case member 4 and the upper case member 5 are assembled by making the mating faces 4a and 5a thereof come into contact with each other. On an inner peripheral edge of the mating face 4a of the under case member 4, a waterproof peripheral wall 4b is provided upright. In a state where both of the under case member 4 and the upper case member 5 are assembled, the waterproof peripheral wall 4b of the under case member 4 is inserted into the upper case member 5 and is disposed so as to closely overlap an inner peripheral surface of the upper case member 5. Thus, intrusion of water is prevented.

At proper positions facing each other on the under case member 4 and the upper case member 5 (at two spots on each of upper and lower surfaces in this embodiment), locking parts 4c and 5c are provided, respectively, which can be locked to each other. When the mating faces 4a and 5a of the under case member 4 and the upper case member 5 come into contact with each other, the corresponding locking parts 4c and 5c are locked to each other. Thus, the under case member 4 and the upper case member 5 are assembled (see FIG. 6).

As shown in detail in FIG. 7, pairs of locking projections 6 and 7 are provided at corresponding positions on left and right side faces of the under case member 4 and the upper case member 5, respectively. Each of the locking projections 6 of the under case member 4 has a U shape when viewed from the front. Each of the locking projections 7 of the upper case member 5 consists of a vertical rib 7a and a horizontal rib 7b which intersect with each other; and a triangular lateral restricting wall 7c disposed so as to connect end faces of the vertical rib 7a and the horizontal rib 7b with each other.

As shown in detail in FIG. 8, the bracket 10 includes: a backside plate part 11 disposed along the vertical direction; a pair of case hook parts 12 provided upright toward the front from both side edges of the backside plate part 11; a harness routing guide wall part 13 provided so as to extend further downward from a lower end of the backside plate part 11; and a pair of fixation pieces 14 provided upright toward the back from both sides of the backside plate part 11. The bracket 10 is formed by pressing a piece of sheet metal.

Each of the case hook parts 12 has a lower restricting wall part 12a and a front restricting wall part 12b, and a locking groove 12c having an opening in its upper side is formed so as to be surrounded by the lower and front restricting wall parts. Each of the front restricting wall parts 12b has a tapered installation guide plane 12d for guiding the locking projection 7 of the upper case member 5 into the locking groove 12c.

As shown in FIGS. 2 to 4, the pairs of locking projections 6 and 7 of the under case member 4 and the upper case member 5 are both locked to the pair of case hook parts 12 of the bracket 10. Thus, the electrical junction box 1 is mounted in a predetermined position on the wall surface along the vertical direction of the vehicle body.

Next, an operation of mounting the electrical junction box 1 will be described. The bracket 10 is previously fixed by welding, bolting or the like on a vehicle body panel and the like in a predetermined mounting space for the electrical junction box 1. First, the electrical junction box main body 2 is housed in the under case member 4 and the upper case member 5, and the under case member 4 and the upper case member 5 are locked to each other to assemble the electrical junction box 1. This assembled electrical junction box 1 is slidingly inserted from above along the backside plate part 11 of the bracket 10 until the pairs of left and right locking projections 6 and 7 of the under case member 4 and the upper case member 5 are locked to the pair of left and right case hook parts 12 of the bracket 10, respectively. Thus, mounting of the electrical junction box 1 is completed.

As described above, in the present invention, the electrical junction box 1 may be simply slidingly attached to the bracket 10, and a mounting operation such as a bolting operation at a mounting position is not required at all. Thus, good mounting workability is achieved. Moreover, the pairs of locking projections 6 and 7 of the under case member 4 and the upper case member 5 are locked to the lower restricting wall parts 12a and the front restricting wall parts 12b of the respective case hook parts 12 in the bracket 10. Thus, the electrical junction box 1 never drops downward or forward. Moreover, the backside plate part 11 of the bracket 10 restricts backward movement of the under case member 4, and the front restricting wall parts 12b of the respective case hook parts 12 in the bracket 10 restrict forward movement of the upper case member 5. Accordingly, both of the under case member 4 and the upper case member 5 cannot be moved in a direction in which the mating faces 4a and 5a are separated from each other. Thus, the under case member 4 and the upper case member 5 are never detached from each other by vibration and the like. Consequently, dropping of the electrical junction box 1 downward and the like and detachment between the under case member 4 and the upper case member 5 can be prevented. Moreover, good mounting workability for the electrical junction box 1 is achieved.

In this embodiment, the installation guide planes 12d for guiding the pair of locking projections 7 of the upper case member 5 are formed in the respective case hook parts 12. Therefore, when the electrical junction box 1 is slidingly attached to the bracket 10, the pair of locking projections 7 of the upper case member 5 are smoothly inserted into the locking grooves 12c of the pair of case hook parts 12 in the bracket 10. As a result, workability for the sliding attachment of the electrical junction box 1 to the bracket 10 and thus the mounting workability for the electrical junction box 1 is improved.

In this embodiment, the respective locking projections 7 of the upper case member 5 have the lateral restricting walls 7c provided therein, which restrict lateral movement of the case hook parts 12. Therefore, it is possible to surely prevent a situation where the pair of locking projections 7 of the upper case member 5 are detached from the pair of case hook parts 12 of the bracket 10 by vibration and the like.

In this embodiment, the respective locking projections 6 and 7 of the under case member 4 and the upper case member 5 are disposed while being closely attached to each other. Thus, reaction force from the lower and front restricting wall parts 12a and 12b of the case hook parts 12 can be dispersed and received by both of the locking projections 6 and 7. Consequently, good strength is achieved.

The invention may be embodied in other specific forms without departing from the sprit of essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A mounting structure of an electrical junction box, comprising:
   an electrical junction box including a housing case and an electrical junction box main body housed in the housing case,
   wherein the housing case has an under case member and an upper case member,
   each of the under case member and the upper case member has a pair of left and right locking projections, and
   the electrical junction box is vertically mounted on a wall surface along a vertical direction in a state where mating faces of the under case member and the upper case member are set in the vertical direction; and
   a bracket fixed to the wall surface and having a backside plate part disposed along the vertical direction and a pair of case hook parts provided upright from both side edges of the backside plate part,
   wherein the electrical junction box is slidingly inserted from above between the pair of case hook parts along the backside plate part in the vertical direction until both of the pairs of the locking projections of the under case member and the upper case member are locked to the pair of case hook parts, and thus is mounted on the wall surface by use of the bracket.

2. The mounting structure of an electrical junction box according to claim 1, wherein
   each of the case hook parts has a lower restricting wall part and a front restricting wall part, and
   each of the case hook parts has a locking groove which is surrounded by the lower and front restricting wall parts and has an opening in an upper side thereof.

3. The mounting structure of an electrical junction box according to claim 2, wherein each of the case hook parts has an installation guide plane which guides each of the locking projections of the upper case member into each of the locking grooves.

4. The mounting structure of an electrical junction box according to claim 1, wherein each of the locking projections of the upper case member has a lateral restricting wall which restricts lateral movement of the case hook parts.

* * * * *